United States Patent Office 2,723,806
Patented Nov. 15, 1955

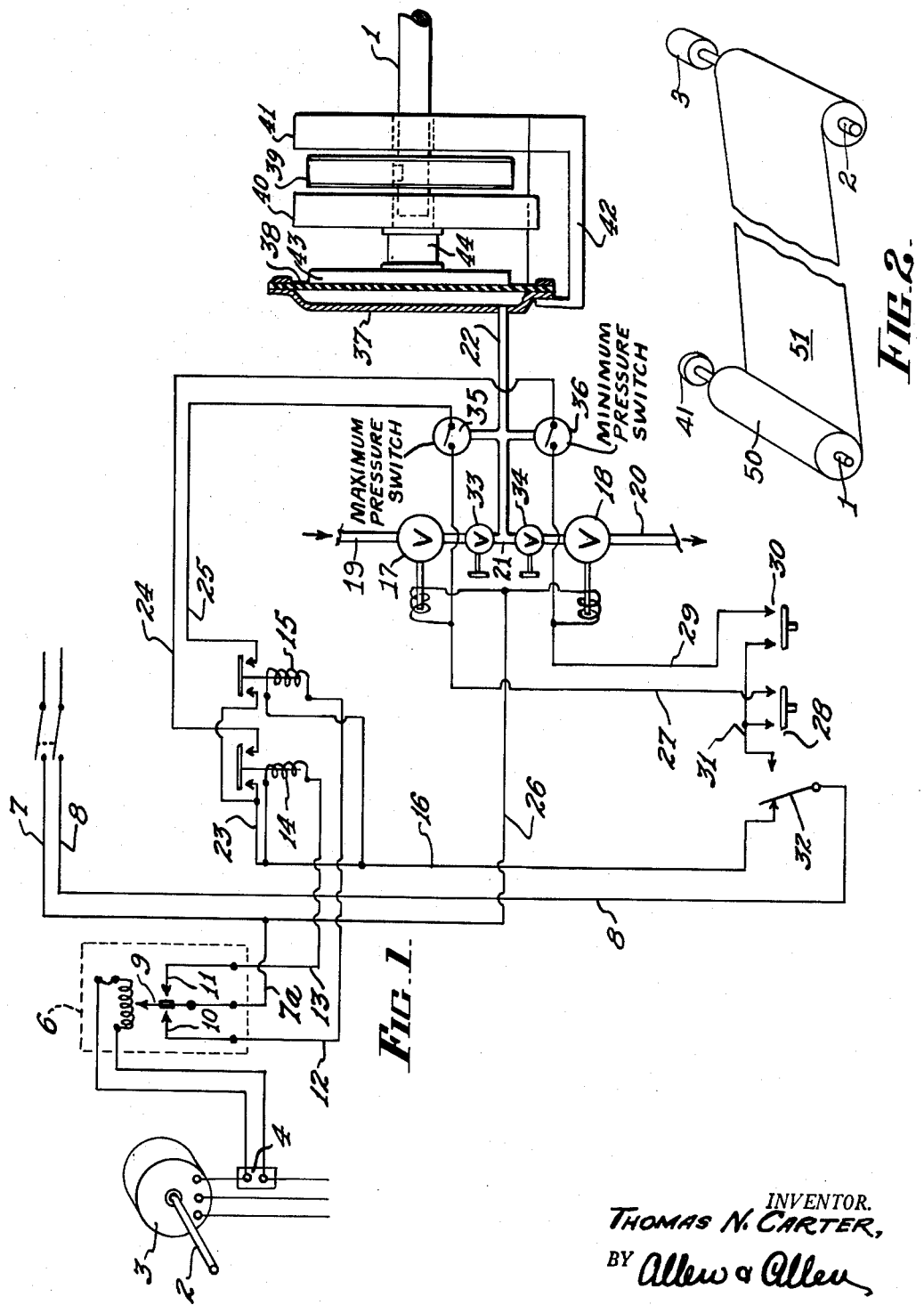

2,723,806

CONSTANT FORCE CONTROLLER

Thomas N. Carter, Hamilton, Ohio

Application June 30, 1954, Serial No. 440,509

10 Claims. (Cl. 242—75)

The invention relates to apparatus in which a force is to be maintained at a constant value in spite of changes in conditions which would tend to vary it. While the invention is by no means confined thereto, an exemplary simple situation presenting the problem is where a web or continuous strand in a roll or coil is being unwound and rewound with or without intervening treatment. If a roll of flexible material is mounted on a shaft and the end of the flexible material carried to another shaft on which it is to be rewound into a second roll, the application of a constant torque to the second shaft will not result in a constant tension on the moving web of flexible material between the shafts. This follows of necessity because as the one roll diminishes in diameter the second roll grows and the leverage through which the torque is transmuted into tension progressively varies from the start of the operation to its conclusion. Similarly in a manufacturing operation wherein a web or strand is moved forwardly by power applied to a shaft or the like and is fed to the operation by means connected with a rearwardly positioned shaft, it does not follow that the material will be constantly and uniformly tensioned in its passage between the shafts even though a constant torque is applied to the leading shaft, if the material encounters varying resistance to forward motion.

In many operations the forward motion of a continuous material at constant speed and under conditions of constant tension is highly desirable, and a primary object of the invention is the attainment of it by relatively simple, inexpensive and sure means.

A continuous web of flexible material, if it is to be tensioned at a constant and uniform value, will require the application of a fixed or uniform amount of energy. Moreover, if the speed of the material varies, the maintenance of uniform and constant tension will require a variation of the applied force proportional to the variations of the speed. Yet again, when the speed of the moving material varies the application of a constant force to the means producing the movement can result in a constant and uniform tension on the material only if its resistance to forward movement is caused to vary with the speed, and conversely.

This invention relates to that type of apparatus in which the application of a constant force to a material so as, for example, to tension it, is attained through the application of energy to the material and through controlling the resistance of the material to the applied energy. This is accomplished by applying the energy through a means in which the delivered force tends to vary with the load, and then causing variations in the delivered energy to produce such changes in the total or over-all load as will tend to make the applied force uniform and constant.

The invention will be described in connection with an operation such as the unwinding of a web of flexible material, e. g. paper or cloth, from a roll on one shaft and the rewinding of it into a roll on a second shaft with, if desired, an intervening treatment which may be anything serving a useful purpose. Slitting or coating may be examples of such intervening treatment but should not be taken as limiting. Specifically in the practice of the exemplary form of the invention a variable braking force is applied to what will be termed the pay-off shaft which force is controlled by variations in the applied force at what will be termed the take-up shaft. Hitherto attempts to vary a drag or braking force in accordance with the power demands of such a system have not been satisfactory for many reasons. Among these is the fact that changes in the braking force, while directionally controlled, have tended to occur too quickly so as to produce uncontrolled load variations which in themselves modify the over-all tension. Yet again the variations produced in the over-all load have been of too great magnitude to exert the proper control, or have not been in true proportion to variations in the applied force. Ancillary objects of the invention involve the solution of these and other similar problems as will hereinafter be made clear.

The various objects of the invention set forth above and hereinafter or which will be apparent to one skilled in the art, are accomplished by that procedure and apparatus assembly of which the aforesaid exemplary embodiment will now be described. Reference is made to the accompanying drawings wherein:

Figure 1 is a diagrammatic representation of an apparatus assembly suitable for the practice of the present invention; and Figure 2 is a diagrammatic representation showing the unwinding of a web of flexible material from a roll on one shaft and the rewinding thereof into a roll on a second shaft after an intervening treatment.

In the exemplary embodiment a pay-off shaft is indicated at 1 and a take-up shaft at 2. For simplicity the pay-off shaft may be considered as journalled in suitable bearings in the frame of a machine and as carrying a roll 50 (Figure 2) of flexible material 51 which is being unwound. The flexible material is carried through any desired treatment means (not shown) and is wound up in a roll 52 on the shaft 2.

Shaft 2 is driven by a motor 3 of a type in which a variation of the load will tend to produce a variation in the applied torque. Such a motor may be a direct or alternating current motor having the above characteristic. As the force applied by the motor varies with the load, the amperage of the motor will vary. Consequently it becomes possible, as for example by the insertion of a shunt 4 in the power leads 5 of the motor to couple an ammeter 6 to the motor so as not only to obtain an indication of the variations of amperage but also to arrange for the opening and closing of appropriate contacts when the amperage rises above or falls below a desired mean by fixed amounts.

In the drawing, power leads are indicated at 7 and 8. The power lead 7 is connected by a lead 7a to the pointer or moving member 9 of the ammeter. The pair of contacts 10 and 11 are located at each side of the moving member 9 so as to be engaged by it for the purpose indicated above. These contacts are connected respectively by leads 12 and 13 to the coils 14 and 15 of a pair of relays. These coils are returned to the power lead 8 by a lead 16. It will be evident that in the arrangement just described one or other of the relays will be actuated if the amperage of the motor 3 rises or falls by predetermined amounts.

The relays are employed to actuate the solenoid valves of a fluid pressure system which is connected to a fluid actuated braking means as hereinafter described. The solenoid valves are indicated at 17 and 18. The valve 17 is connected into a fluid pressure inlet line 19, while the valve 18 is connected into a fluid pressure outlet line 20. The valves 17 and 18 are interconnected by a conduit 21 to the mid-point of which another conduit 22 is connected, the last mentioned conduit running to the fluid pressure braking means. If compressed air is being employed as the fluid under pressure the valve 17 may be connected by the conduit 19 to a compressor or storage tank while the conduit 20 may simply be left open to the atmosphere. In the use of some other fluid the conduit 19 may be connected to a source of it under pressure while the conduit 20 may furnish a fluid return path to a pump or the like.

It will be evident from the above that if the valve 17 be opened while the valve 18 be closed, fluid under pressure will be introduced into the conduit 22 to actuate the fluid pressure brake in one direction. Conversely, if valve 17 be closed and valve 18 be opened the fluid pressure in conduit 22 will be relieved and the brake will effectively be actuated in the opposite direction.

In the exemplary apparatus assembly this is accomplished electrically. The power lead 8 through leads 16 and leads 23 is connected to one of the contacts of each of the relays as shown. The other contact of the relay which has the coil 14 is connected by a lead 24 to the solenoid valve 18, while the other contact of the relay having the coil 15 is connected through the lead 25 to the solenoid valve 17. The valves 17 and 18 have a power return to power lead 7 through a line 26.

In apparatus of this type it is advisable to provide for selective manual and automatic operation. The solenoid valve 17 is connected by a lead 27 to one of the contacts of a single pole, single throw "increase" switch 28. Solenoid switch 18 is connected by a lead 29 to one of the contacts of a single pole, single throw "decrease" switch 30. The other contacts of the switches 28 and 30 are connected by a lead 31 to the "manual" contact of a single pole double throw switch 32. The other part of this switch is connected as shown between the leads 8 and 16.

With switch 32 thrown to the manual position, the relays hereinabove described are thrown out of circuit. Actuating the "increase" switch 28 will energize solenoid valve 17 and cause the brake to be actuated to the "on" position. Closing the "decrease" switch 30 will cause the solenoid valve 18 to be actuated so as to relieve the fluid pressure on the brake. The switches 28 and 30 are preferably push-button switches spring biased to return to the "off" position. Such an arrangement is advantageous in starting and threading operations where it may be desired to start the mechanism without appreciable tension, to relieve tension quickly if an emergency arises, and to bring the tension up to a value near normal before the start of an automatic operation.

When the switch 32 is thrown to the opposite or "automatic" position, switches 28 and 30 are thrown out of circuit, and the operations of valves 17 and 18 will be controlled by the moving member of the ammeter 6 through the relays hereinabove described without further attention from the operator.

While by these means the operations of the brake element on the shaft 1 can be made responsive to power changes at the motor 3, abrupt changes in the braking force may themselves create changes and fluctuations in the tension on the web. This can be corrected in accordance with the present invention by means which operate to cause changes in the braking pressure to occur gradually. To this end there is inserted in the connection between the valve 17 and the conduit 22 which leads to the brake a needle valve 33; and another needle valve 34 is placed in the connection between the solenoid valve 18 and the conduit 22. Thus when the valve 17 is opened through the action of the appropriate relay a sudden surge of fluid pressure in the braking apparatus does not ensue. Similarly when the valve 18 is opened there will be no sudden and abrupt relief of pressure in the pressure chamber of the brake. The needle valves 33 and 34 can be adjusted so that the response of the braking element will occur gradually and at any rate desired.

In order to exert control throughout the entire operation, the desired tension must be at such value as normally to require some application of the braking force. In other words if the braking force decreased to zero during the operation of the mechanism, one-way control only would be possible. The tension could be increased but not diminished. As a consequence means are provided for establishing the extreme limits of the operation so that control may be maintained within a predetermined range. In the lead 25 from the relay to the solenoid switch 17 there is placed a pressure switch 35. This acts to open the circuit to the valve 17 if the pressure in the conduit 22 rises above a predetermined value. Similarly in the lead 25 of the solenoid switch 18 there is placed a pressure switch 36 which acts to open the circuit to the valve 18 if the pressure in the conduit 22 falls below a predetermined value. In their most convenient form these pressure switches comprise pressure indicating means having a fluid connection with the conduit and arranged to actuate suitable switches in the appropriate electrical leads. Preferably these pressure switches are adjustable.

The provision of the pressure switch 36 insures that the solenoid valve 18 will close when the pressure in the conduit 22 attains a predetermined minimum but positive value, while the pressure switch 35 insures the closing of the valve 17 upon the attainment of a predetermined maximum pressure value in the conduit 22. The mechanism is so adjusted that the required tension control can be attained in a range of brake pressure values which lies above zero or atmospheric pressure. If the required tension cannot be attained within this range then the machine is out of adjustment and must be corrected. The contacts in the ammeter 6 are made adjustable so that a suitable positive range may be chosen, given the desired tension on the material being treated.

The braking device may be widely varied; and its nature does not constitute a limitation on the invention. For the purposes of an exemplary disclosure a braking apparatus has been indicated comprising a member 37, to which the conduit 22 connects. This member is closed by a flexible diaphragm 38 forming with it a pressure chamber.

The shaft 1 has slidably keyed to it a friction element 39, which rotates between pressure elements 40 and 41. These last mentioned elements are not attached to the shaft but are anchored with respect to the frame of the machine so as to be non-rotatable. There is shown a frame element 42 interconnecting pressure element 41 and the fluid pressure chamber element 37. The pressure element 40 is indicated as slidably keyed to the element 42. The diaphragm 38 carries a plate 43 which is connected by a stud 44 or other motion transmitting means to the movable pressure element 40.

It will be evident that as fluid pressure is introduced into the chamber formed by elements 37 and 38 through the conduit 22 these elements will tend to move together, engaging the friction element 39 under greater or less force dependent upon the fluid pressure. Since the elements 40 and 41 are non-rotatable, a braking force will be exerted on the shaft 1 depending upon the magnitude of the fluid pressure in the chamber 37, 38.

Modifications may be made in the invention without departing from the spirit of it. By way of example relays in the electrical interconnections may be multiplied or eliminated. The arrangement of contacts on the ammeter 6 may likewise be varied. Thus an arrangement could be adopted in which both sets of contacts are engaged when the tension is at the desired level, one or the other of the contact sets being arranged for disengagement as the power on the motor rises or falls. With suitable arrangement of the relays and solenoid valves these can be caused to open and close in the desired order.

The invention having been described in an exemplary embodiment, what is claimed as new and desired to be secured by Letters Patent is:

1. In apparatus of the class described a pair of shafts, one of said shafts being adapted to unwind a continuous strand of flexible material and the other of said shafts being adapted to rewind said strand, fluid pressure braking means on one of said shafts and a driving motor connected with the other of said shafts, and means for producing an inverse variation of the braking force to the power demand of said motor so as to maintain a constant tension on said material, said means comprising a device arranged to open and close electrical contacts in accordance with the power demand of said motor, solenoid actuated pressure and relief valves for said braking means and electrical interconnections between said contacts and solenoids, together with means for limiting the response of said braking means.

2. The structure claimed in claim 1 wherein said response limiting means comprises needle valves connected respectively between said solenoid actuated valves and said braking means.

3. The structure claimed in claim 1 wherein said limiting means includes pressure actuated switches in the leads to said solenoid actuated valves, said pressure actuated switches having connection with said braking means and acting to confine the fluid pressure therein to predetermined minimum and maximum limits.

4. The structure claimed in claim 1 wherein said reponse limiting means include means for causing the application and relief of fluid pressure on said braking means to occur gradually and limiting means for maintaining the fluid pressure on said braking means within predetermined minimum and maximum limits.

5. In a structure of the class described a first shaft adapted to unwind a continuous strand of flexible material, a fluid pressure braking means connected therewith, a second shaft adapted to rewind said strand, a direct current motor connected therewith, an ammeter connected with said direct current motor and having sets of contacts for opening and closing a pair of electrical circuits, fluid pressure supply and relief means for said braking means including a solenoid actuated pressure valve and a solenoid actuated relief valve, electrical connections between said respective valves and the set of contacts of said ammeter, and response limiting means connected between said solenoid actuated valves and said fluid pressure braking means.

6. The structure claimed in claim 5 wherein relays are inserted respectively in the electrical connections between said sets of ammeter contacts and said solenoid valves.

7. The structure claimed in claim 5 wherein relays are inserted respectively in the electrical connections between said sets of ammeter contacts and said solenoid valves, a single pole double throw switch having a set of contacts in a power lead to the said relay means and a set of contacts bypassing said relay means and acting to apply power directly to said solenoid valves through leads, and manually operable switch means in each of the last mentioned leads for the actuation of said valves.

8. The structure claimed in claim 7 wherein said response limiting means includes needle valves located respectively between said solenoid actuated valves and said fluid pressure braking means.

9. The structure claimed in claim 7 wherein said response limiting means includes pressure actuated switches having connection with said fluid pressure braking means and located in leads between said relays respectively and said solenoid actuated valves respectively.

10. The structure claimed in claim 7 wherein said response limiting means includes both means for causing the application and relief of pressure to said fluid pressure braking means to be gradual, and means for limiting the fluid pressure on said braking means to a range between predetermined maximum and minimum values.

References Cited in the file of this patent
UNITED STATES PATENTS

| | | |
|---|---|---|
| 2,206,580 | Potdevin et al. | July 2, 1940 |
| 2,631,790 | Wheldon | Mar. 17, 1953 |
| 2,631,791 | Wheldon | Mar. 17, 1953 |
| 2,667,311 | Packer et al. | Jan. 26, 1954 |